United States Patent [19]

Moser

[11] 4,218,102
[45] Aug. 19, 1980

[54] SPINDLE BEARING FOR SPINDLE SHAFT

[76] Inventor: Fernand Moser, Sur le Crêt 83H, Corgémont, Switzerland

[21] Appl. No.: 13,116

[22] Filed: Feb. 21, 1979

[30] Foreign Application Priority Data

Feb. 23, 1978 [CH] Switzerland ............... 1990/78

[51] Int. Cl.³ ............................................. F16C 19/36
[52] U.S. Cl. ................................ 308/174; 308/205; 308/DIG. 13
[58] Field of Search ............... 308/174, DIG. 13, 205, 308/215, 202, 176, 175; 74/89.15

[56] References Cited

U.S. PATENT DOCUMENTS

| 2,611,280 | 9/1952 | Brinkhurst | 82/5 |
|---|---|---|---|
| 3,963,286 | 6/1976 | Stanley | 308/215 |
| 4,037,893 | 7/1977 | Perrin | 308/205 |
| 4,050,319 | 9/1977 | Stanley | 74/89.15 |

Primary Examiner—Lenard A. Footland
Attorney, Agent, or Firm—Ladas & Parry

[57] ABSTRACT

The spindle bearing for the spindle shaft relative to a support to be shifted has at least one pivoted roller. The roller is geared by its peripheral groovings into a thread of the spindle shaft. In order to keep the required precision of the feed during an appearance of heavy loads in the axial direction, the roller and the spindle shaft are supported against each other in such a way, that the relative position of axes of the roller and of the spindle shaft remains unchanged during the action. The roller is adjustably supported crosswise to the spindle shaft through needle bearings, taking up axial and radial forces, in order to achieve a complete freedom from play.

9 Claims, 5 Drawing Figures

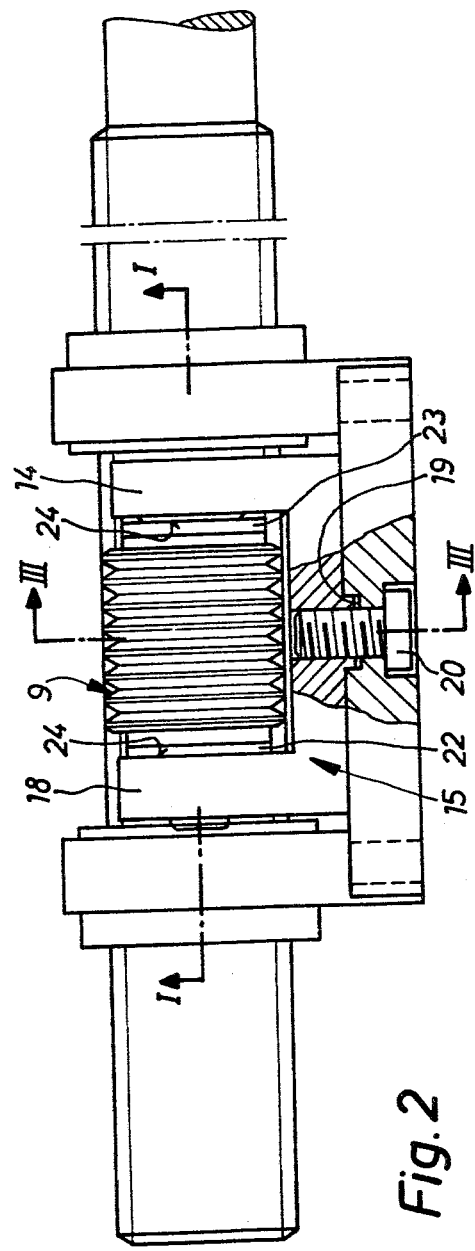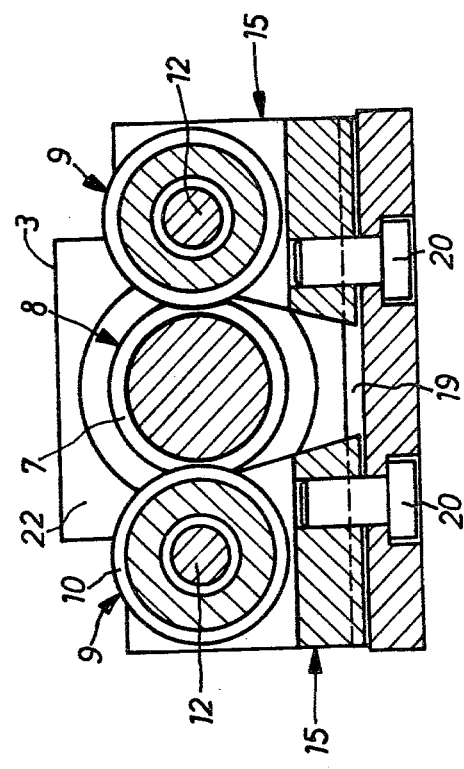
Fig. 2
Fig. 3

SPINDLE BEARING FOR SPINDLE SHAFT

BACKGROUND OF THE INVENTION

The invention is concerned with a spindel bearing for a spindel shaft relative to a support, the spindel bearing having at least one pivoted roller. The roller is geared by peripheral groovings into a thread of the spindel shaft and arranged parallel thereto.

DESCRIPTION OF THE PRIOR ART

Such spindel bearings are known. Two different groups of such known devices can be distinguished. The spindel bearings of the first group, as disclosed in the Canadian Pat. No. 973 394 or in the German Pat. No. 20 65 442, have rollers depressed by a spring tension against the spindel shaft. An appearance of strong axial forces in the spindel bearings causes a radial evasion of the rollers against the spring tension, because of the trapezoidal threads, which is followed by an inaccurate push. Furthermore, hinges and levers, which are necessary for these structures, produce unstable and too elastic devices, which do not satisfy the great demands required for the precision.

The second group includes spindel bearings, the rollers of which are uniformly distributed planet rollers, pivoted and running during the operation around the spindel. To this group belong the devices disclosed in the U.S. Pat. No. 4,050,319, in the Swiss Pat. No. 596 475 and in the German published Patent Application No. 25 40 348. Such devices have the disadvantage of an expensive construction and a difficult adjustment. Care has to be taken to a completely exact rotation, free from play of the rollers. If any play of the rollers appears, there is required an exhaustive adjusting procedure in order to remove this play.

SUMMARY OF THE INVENTION

The object of the invention is to provide an exactly precise spindel bearing, as described above, which does not have the aforesaid disadvantages, which permits heavy loads and high speed of rotation and which can be made free from play in a simple manner.

It is provided in accordance to the solution of this task, that the roller and the spindel are supported against each other in such a way that the relative position of the spindel and roller axes remains unchanged during the operation and that the roller is adjustably mounted crosswise to the spindel shaft through roller bearings which take up the axial and radial forces.

In a preferred realization of the invention the spindel shaft is held onto the support by needle bearings installed on both sides of the roller. The supporting surfaces of the needle bearings are working together with truncated tops of the spindel shaft's thread as an outer support, whereas the roller can be mounted on a slide adjustably installed on the support crosswise to the spindel. The roller is fitted to the slide through second and third needle bearings which take up the axial and radial forces, respectively.

The spindel shaft is supported through the first needle bearings around its entire circumference preferably in such a way, that the supporting surfaces of the needle bearings are working together with the truncated tops of the spindel shaft's thread as an outer support. If the spindel bearing is provided by said needle bearings, then the ratio of friction is in the best condition, because only rolling, no sliding, friction dominates in the whole spindel bearing.

The needle bearings provide for an exactly precise radial support uniformly distributed around the entire circumference, which leads to the constancy of the relative position between the spindel and roller axes and therewith to the desirably high loading capacity of the spindel shaft in the radial direction with unchanged precision. The support in the axial direction is mainly achieved by the paraxial rollers. These can be preferably adjusted crosswise to the spindel shaft, so that a freedom from play and also a prestressing if desired can be achieved in the axial direction.

In a preferable realization of the roller's adjustability the rollers or each roller are mounted on a slide crosswise adjustable to the spindel shaft by means of roller bearings, particularly needle bearings, which take up the axial and radial forces.

If more rollers are desired in order to rise the loading capacity, then the rollers are uniformly distributed around the spindel shaft's circumference and staggered axially in reverse order each to the other with its groovings, whereby the axial staggering between the rollers corresponds to a fraction of the axial spacing of turns of the spindel shaft's thread. The axial staggering of the rollers can be thereby produced in a simple way by means of axially adapted supporters, which are placed between the roller's surface areas and the bearing unit of the slide for the roller axis. In this way the axial adjustment of the rollers relatively to each other can be provided simply and exactly, before radial positioning of the rollers on the spindel is carried out by means of the displacement of the slide, singly intended for each roller, in the direction to the spindel shaft.

In another preferred realization the roller and the support are adjustably mounted on a leading bar running parallel to the spindel axis, whereas first roller bearings taking up radial forces are mounted between the roller and the leading bar, second roller bearings taking up the axial forces are mounted between the roller and the support, and the leading bar is adjustably supported by bearing blocks against the spindel. The leading bar supports the roller against the spindel and guarantees the constancy of the relative position of the roller and spindel axes. The roller is crosswise adjustable to the spindel by changing the distance between the leading bar axis and the spindel axis, by which the freedom from play can be achieved by the axial direction.

The groovings of the rollers can be placed in perpendicular planes to the spindel shaft axis. The feeding speed of the spindel is the result of the axial spacing of turns of the spindel shaft's thread and of the rotational speed.

In order to rise this feeding speed the groovings of the rollers can be formed as a thread working together with the thread of the spindel shaft. Hence it follows, that the axial spacing of turns of the spindel shaft's thread and of the roller's thread will be added together which rises accordingly the feeding speed.

BRIEF DESCRIPTION OF THE DRAWINGS

FIG. 2 is a partially cut side-view of the first spindel bearing;

FIG. 3 is a sectional drawing according to the line III—III in FIG. 2;

DETAILED DESCRIPTION OF THE PREFERRED EMBODIMENTS

Figure 1:
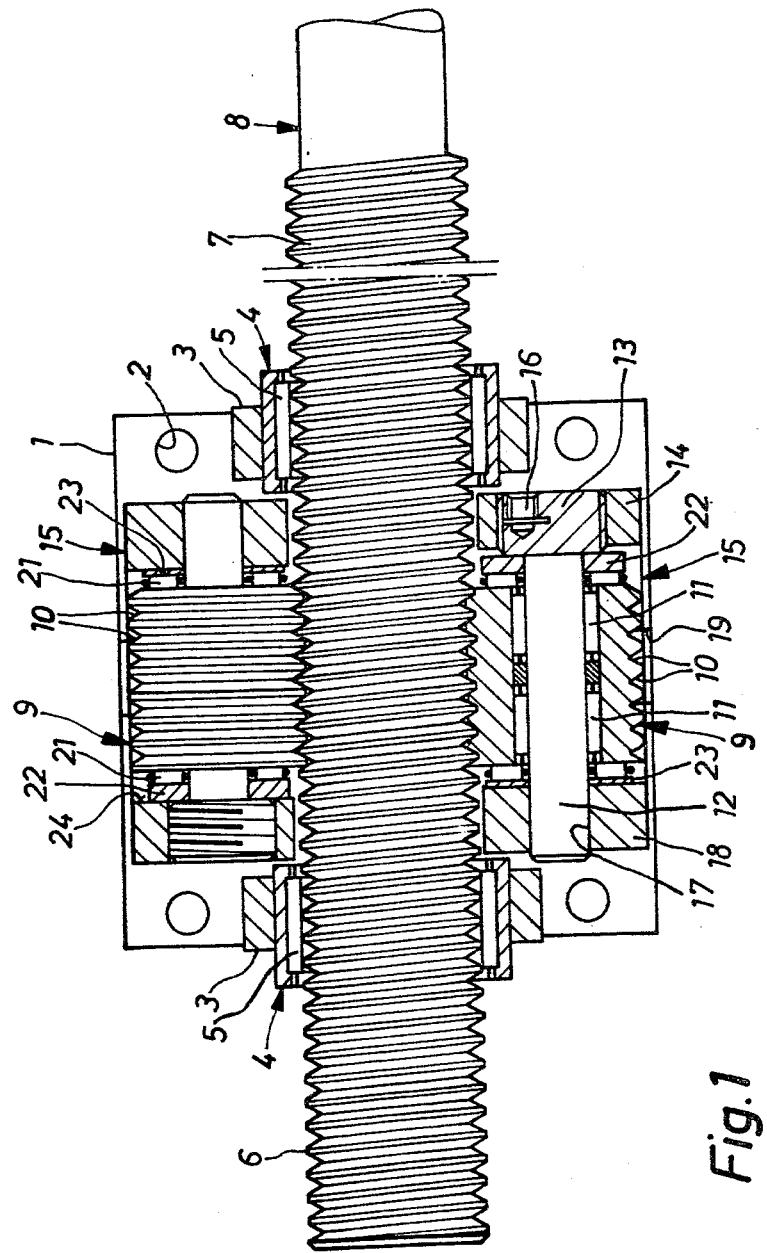
FIG. 1 is a sectional drawing of a first spindel bearing according to the line I—I in FIG. 2.

The shown first spindel bearing according to the FIGS. 1 to 3 encloses a support 1 which can be fixed by using mounting holes 2 on a not shown stand. The support 1 has on each two opposite ends a bearing block 3 with a bearing hole in which a thread of a radial needle bearing 4 is placed. The needles 5 of the needle bearing 4 roll on truncated tops 6 of the threading 7 of the spindel shaft 8 to be supported. In this way the spindel shaft 8 is supported on two places, distanced axially from each other and is supported radially and uniformly around the entire circumference and is pivoted only through the rolling friction.

If the friction occuring in a sleeve bearing is allowable and if the radial loads of the spindel go beyond the transferable load of the needle or another radial bearing, then sleeve bearings can be used instead of the needle bearings 4.

Two rollers 9 are mounted axially in an angle of 180° on the circumference of the spindel shaft 8 paraxially to the same. The rollers 9 have on its circumferences V-shaped groovings 10 placed in perpendicular planes to the spindel shaft axis. The groovings 10 are formed in order to work together with the thread 7 of the spindel shaft 8 by touching and rolling on the thread's flanks. Both rollers 9 are mounted through radial needle bearings 11 on roller axes 12. Each axis 12 is screwed by a head 13 into a bearing unit 14 of the U-shaped slide 15 and secured through a device 16, which is locking the thread of the head 13 in the bearing unit 14. The axis 12 is inserted with its other plain end in a receiving hole 17 of the opposite bearing unit 18 of the same slide 15. Each slide 15 can be shifted in a groove 19 of the support and locked through a setscrew 20. The groove 19 is going crosswise to the axes of the spindel shaft 8 and of the rollers 9.

The rollers 9 are supported on the internal surfaces of the bearing units 14, 18, which are facing each other, by means of needle bearings 21 and supporters 22, 23. The supporters 22, 23 are exactly calibrated in the axial direction and are differently thick. They are formed in a way that the rollers can be preliminary mounted with a staggering to each other in both slides, whereby the staggering corresponds exactly to the half of the axial spacing of turns of the thread 7. If in order to rise the axial loading capacity of the spindel shaft 8 three or four rollers 9 are needed on the circumference of the spindel shaft 8, then they have to be arranged in an angle of 120° or 90° to each other, whereby the axial staggering corresponds to a third or fourth part of the axial spacing of turns 7 of the thread 7 of the spindel shaft 8.

The utilization of the supporters 22, 23 or other supporters axially calibrated in the same or in a different way allows without a great expense such an exact axial adjustment of the rollers 9 to each other, so that an axial freedom from play can be achieved and if desired also a pretension between the thread's flanks and the flanks of the groovings 10 can be achieved.

The slides 15 supporting the rollers 9 are shifted for final assembly along the grooves 19 to the spindel shaft 8 in such a way that any play in the radial direction will be canceled. Thereafter, the setscrews 20 will be tightened.

If the feeding speed of the spindel should be rised, then the groovings 10 will not be formed in perpendicular planes to the rollers 9 as circularly closed groovings but in continuous groovings formed as threads, which can have for example the same axial spacing of turns as the thread 7 of the spindel shaft 8. With such an arrangement a particularly high feeding speed of the spindel shaft 8 can be achieved, because the axial spacing of turns of the threads of the spindel shaft 8 and of the rollers 9 will be added together, which rises accordingly the feeding speed.

Figure 4:
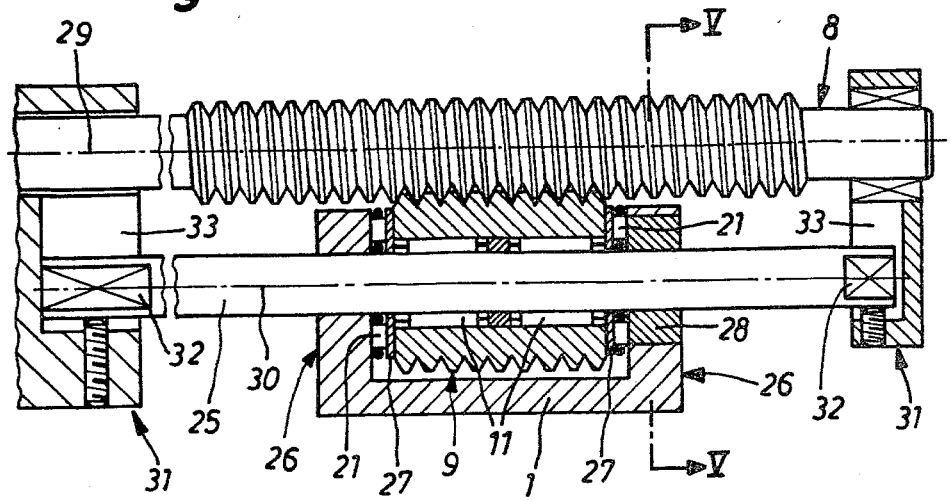
FIG. 4 is a side-view of a second spindel bearing.
Figure 5:
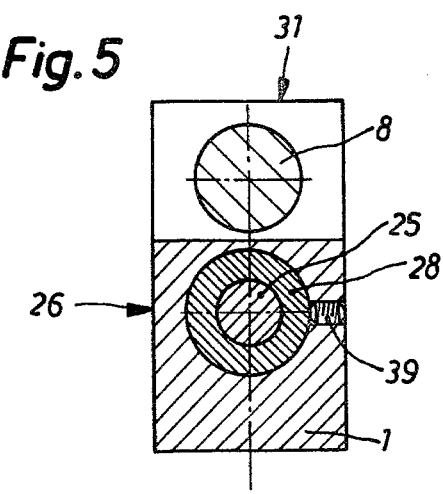
FIG. 5 is a sectional drawing according to the line V—V in FIG. 4.

A second preferable embodiment of the invention is shown in FIGS. 4 and 5. The roller 9 is thereby placed on a leading bar 25 and between bearing brackets 26 of the support 1. The roller 9 is supported radially through needle bearings 11 on the leading bar 25 and axially through needle bearings 21 between the bearing brackets 26. Supporters 27 are placed between the axial needle bearings 21 and the bearing brackets 26 and are utilized as supporting surfaces. The arrangement of the rollers 9 between the bearing brackets 26 can be made free from play by using a liner 28 in one of the bearing brackets 26. The liner 28 will be tightened by a screw 39.

The leading bar 25 is fixed in the same bearing blocks 31 as the spindel shaft 8 on both ends. The axes of the spindel 29 and of the leading bar 30 are thereby staying in the unchangeable, relative position during the action. The bearing blocks 31 are placed on both sides of the ends of the leading bar 25 or of the spindel shaft 8. The leading bar 25 is mounted crosswise in the bearing blocks 31 and can be adjusted crosswise to the axis of the spindel 25, whereby the distance between the axis of the spindel 29 and the axis of the leading bar 30 can be adjusted in such a way that the roller 9 is sitting completely free from play on the spindel shaft 8. This adjustability of the leading bar 25 is made possible by its truncated ends 32 which can be moved in the clearances 33 of the bearing blocks 31 passing crosswise to the axis of the spindel 29 and tightened by screws therein.

It is obvious from the foregoing that the invention represents an apparatus for the spindel bearing, which allows with simple means the high precision, free from play in the axial as well as in the radial direction, high load capacity and high rotation speed of the spindel shaft.

While there are shown and described present preferred embodiments of the invention, it is to be distinctly understood that the invention is not limited thereto, but may be otherwise variously embodied and practiced within the scope of the following claims. Accordingly,

What is claimed is:

1. Apparatus for spindle bearing, comprising
support means;
carrier shaft means;
spindle shaft means;
at least a roller means; and
first and second needle bearing means;
wherein said roller means (9) are rotatably supported on said carrier shaft means (12,25), the thread of said spindle shaft means (8) being in gear with groovings on the circumference of said roller means (9); wherein said roller means are placed paraxially to said spindle shaft means and are supported in a way that the relative position of the axis of said roller means and of the axis of said spindle shaft means is not changed during operation; wherein said carrier shaft means (12;25) is unrotatably mounted and is adjustable crosswised to said spindle shaft means (8), and wherein said second needle bearing means (11) are arranged between said carrier shaft means and said roller means to take up radial forces and said first needle bearing means (21) are arranged between said support means and said roller means to take up axial forces.

2. The apparatus of claim 1, wherein said groovings of said roller means are placed in perpendicular planes to said axis of said spindle shaft means.

3. The apparatus of claim 1, wherein said groovings of said roller means are formed as a thread working together with said thread of said spindle shaft means.

4. The apparatus of claim 2 or 3, wherein said spindel shaft means is supported in two radial bearings on said support means, said radial bearings being placed on both sides of said roller means, and supporting surfaces of said thread of said spindle shaft means with truncated tops working together with said radial bearings.

5. The apparatus of claim 4, wherein each of said roller means is supported on a slide means which is mounted on said support means crosswise adjustable to said spindle shaft means.

6. The apparatus of claim 5, wherein by utilization of a plurality of said roller means, said roller means are uniformly distributed on a circumference of said spindle shaft means and axially staggered with their groovings each to the other, whereby said axial staggering between said roller means corresponds to a fraction of an axial spacing of turns of said thread of said spindel shaft means.

7. The apparatus of claim 6, wherein said axial staggering of said roller means is produced by means of supporter means exactly calibrated in axial direction, said supporter means being placed betweem front surfaces of said roller means and opposite supporting surfaces of two bearing units on said slide means which between units said roller means are held.

8. The apparatus of claim 1, 2 or 3, wherein by utilization of a plurality of said roller means said roller means are uniformly distributed on a circumference of said spindle shaft means and axially staggered with their groovings each to the other, whereby said axial staggering between said roller means corresponds to a fraction of an axial spacing of turns of said thread of said spindle shaft means.

9. The apparatus of claim 2 or 3 wherein said roller means (9) and said support means (1) are placed on said carrier shaft means (25) and are freely shiftable along the axis of the carrier shaft means which is extending para-axially to the axis of said spindle shaft means, and wherein said carrier shaft means (25) being supported in bearing block means (31) and being adjustable relative to said spindle shaft means (8).

* * * * *